United States Patent
Mujtaba et al.

(10) Patent No.: US 8,743,852 B2
(45) Date of Patent: Jun. 3, 2014

(54) METHODS FOR COORDINATED SIGNAL RECEPTION ACROSS INTEGRATED CIRCUIT BOUNDARIES

(75) Inventors: Syed A. Mujtaba, Santa Clara, CA (US); Madhusudan Chaudhary, Sunnyvale, CA (US); Thanigaivelu Elangovan, Santa Clara, CA (US); Karthik Anantharaman, Sunnyvale, CA (US); Weiping Dou, San Jose, CA (US); Isabel G. Mahe, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 13/347,925

(22) Filed: Jan. 11, 2012

(65) Prior Publication Data

US 2013/0016632 A1 Jan. 17, 2013

Related U.S. Application Data

(60) Provisional application No. 61/433,159, filed on Jan. 14, 2011.

(51) Int. Cl.
*H04H 20/67* (2008.01)
*H04W 4/00* (2009.01)
*H04J 3/16* (2006.01)
*H04J 3/22* (2006.01)
*G08C 17/00* (2006.01)

(52) U.S. Cl.
USPC ............ 370/339; 370/311; 370/329; 370/463

(58) Field of Classification Search
USPC .................. 370/229, 328, 329, 339, 463, 311
See application file for complete search history.

(56) References Cited

U.S. PATENT DOCUMENTS

| | | | |
|---|---|---|---|
| 6,643,522 | B1 | 11/2003 | Young |
| 6,678,508 | B1 | 1/2004 | Koilpillai et al. |
| 7,403,508 | B1 | 7/2008 | Miao |
| 7,894,393 | B2 | 2/2011 | Srinivas et al. |
| 7,933,561 | B2 | 4/2011 | Sanguinetti |

(Continued)

FOREIGN PATENT DOCUMENTS

EP 1626522 A1 2/2006

OTHER PUBLICATIONS

Mujtaba et al. U.S. Appl. No. 13/195,732, filed Aug. 1, 2011.
Mujtaba et al. U.S. Appl. No. 13/099,081, filed May 2, 2011.

*Primary Examiner* — Ronald Abelson
(74) *Attorney, Agent, or Firm* — Park, Vaughan, Fleming & Dowler LLP

(57) ABSTRACT

A wireless electronic device having first and second baseband processors is provided. In one suitable arrangement, radio-frequency power splitters and adjustable low noise amplifiers may be form in the receive paths. The use of power splitters allow signals associated with the first and second baseband processors to be received in parallel. In another suitable arrangement, radio-frequency switches are used in place of the power splitters. The states of the switches may be controlled using at least one of the first and second baseband processors. The use of switches instead of power splitters requires that wake periods associated with the first baseband processor and wake periods associated with the second baseband processor are non-overlapping. To ensure minimal wake period collision, a wake period associated with the second baseband processor may be positioned at a midpoint between two successive wake periods associated with the first baseband processor.

12 Claims, 6 Drawing Sheets

(56) References Cited

U.S. PATENT DOCUMENTS

| | | |
|---|---|---|
| 8,055,313 B2 | 11/2011 | Behzad et al. |
| 8,095,083 B2 | 1/2012 | Raghuraman |
| 2004/0048577 A1 | 3/2004 | Godfrey |
| 2006/0121934 A1 | 6/2006 | Jeong et al. |
| 2007/0072636 A1* | 3/2007 | Worfolk et al. ............... 455/502 |
| 2007/0129104 A1 | 6/2007 | Sano et al. |
| 2008/0102885 A1 | 5/2008 | Tu et al. |
| 2008/0118014 A1* | 5/2008 | Reunamaki et al. .......... 375/356 |
| 2008/0165758 A1 | 7/2008 | Kato et al. |
| 2009/0059826 A1 | 3/2009 | Zhao et al. |
| 2009/0285167 A1 | 11/2009 | Hirsch et al. |
| 2009/0310586 A1 | 12/2009 | Shatti |
| 2010/0135193 A1 | 6/2010 | Przadka |
| 2010/0227570 A1 | 9/2010 | Hendin |
| 2011/0293044 A1 | 12/2011 | Kent et al. |

* cited by examiner

METHODS FOR COORDINATED SIGNAL RECEPTION ACROSS INTEGRATED CIRCUIT BOUNDARIES

This application claims the benefit of provisional patent application No. 61/433,159, filed Jan. 14, 2011, which is hereby incorporated by reference herein in its entirety.

BACKGROUND

This relates to electronic devices such as cellular telephones and, more particularly, to methods for coordinating signal reception across wireless integrated circuit boundaries.

Electronic devices such as cellular telephones contain wireless circuitry such as radio-frequency transceiver integrated circuits and associated wireless baseband integrated circuits. These wireless integrated circuits may be used in handling wireless voice and data communications during operation of an electronic device.

To minimize power consumption and extend battery life, it is generally desirable to place wireless integrated circuits in a low power sleep state when they are not being actively used. When a wireless integrated circuit is needed to handle a wireless communications task, the wireless integrated circuit can be awoken from its sleep state.

Challenges can arise in managing the sleep states and wake states of wireless integrated circuits in devices that contain multiple integrated circuits for handling different communications protocols. If care is not taken, resource conflicts can arise between the wireless integrated circuits that degrade performance.

It would therefore be desirable to be able to provide improved ways in which to coordinate the operation of wireless integrated circuits in an electronic device.

SUMMARY

Electronic devices having wireless communications capabilities are provided. A wireless electronic device may include at least first and second baseband processing integrated circuits (sometimes referred to as baseband processors). The first baseband processor may be configured to support packet switching technologies (e.g., the EV-DO radio access technology, the LTE radio access technology, etc.), whereas the second baseband processor may be configured to support circuit switching technologies (e.g., the CDMA2000 1xRTT cellular telephone communications protocol, the UMTS cellular telephone communications protocol, the GSM cellular telephone communications protocol, etc.).

In one suitable embodiment of the present invention, the first and second baseband processors may be coupled to at least one antenna via radio-frequency switches, duplexers, and diplexers. In particular, radio-frequency power splitters may be interposed in the receive path between the duplexers and the transceiver circuitry associated with the first and second baseband processors. The radio-frequency power splitters allow for asynchronous operation of the first and second baseband processors (e.g., the first and second baseband processors may awake from sleep mode and establish active communications session regardless of the state of each other) at the cost of power loss when splitting the signals into multiple reduced-power versions. To compensate for this power loss, low noise amplifiers may be used. The gain of the low noise amplifiers may be controlled using the first and second baseband processors.

In another suitable embodiment of the present invention, the first and second baseband processors may be coupled to two antennas via duplexers, diplexers, and radio-frequency switches (but without the use of radio-frequency power splitters and low noise amplifiers). For example, each of the switches may be configured to connect the antenna to at least one of the transmit/receive ports of the transceiver circuitry associated with the first and second baseband processors. The use of switches instead of power splitters requires that the operation associated with the first and second baseband processors be at least somewhat coordinated.

Consider a scenario in which both first and second baseband processors are placed in sleep mode. The second baseband processor may be configured to periodically awake from sleep mode to monitor for the presence of paging signals for a first wake period. The frequency at which the second baseband processor wakes up may be predetermined. If a paging signal is detected during the first wake period, a voice call may be established using at least one of the two antennas (e.g., using the antenna that is receiving signals having higher signal strength). If the paging signal is not detected, the second baseband processor may revert back to sleep mode.

When the second baseband processor is in sleep mode, the first baseband processor may awake from sleep mode to monitor for a second wake period to monitor for the presence of paging signals. It may be desirable to position the second wake period such that the second wake period does not collide with the first wake periods. For example, the second wake period may be positioned midway in time between two successive first wake periods. Configured in this way, the probability of wake period collision is minimized. If a paging session is not detected during the second wake period, the first baseband processor may revert back to sleep mode.

If a paging signal is detected during the second wake period, a data session may be established using at least one of the two antennas. If a data session extends into a subsequent first wake period, the device may devote at least one antenna for monitoring paging signals for the second baseband processor (e.g., the antenna that is receiving signals having higher signal strength may be used for monitoring paging singles for the second baseband processor). If the second baseband processor detects a paging signal, the data session may be terminated so that the device can devote its resources to establish and maintain a voice call. The second baseband processor may be given priority over the first baseband processor (because incoming voice calls may be considered most urgent). As a result, the states of the radio-frequency switches may be controlled via control signals generated using the second baseband processor (as an example).

Further features of the present invention, its nature and various advantages will be more apparent from the accompanying drawings and the following detailed description.

DETAILED DESCRIPTION

Electronic devices may be provided with wireless communications circuitry. The wireless communications circuitry may be used to support wireless communications in multiple wireless communications bands. The wireless communications circuitry may include multiple antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
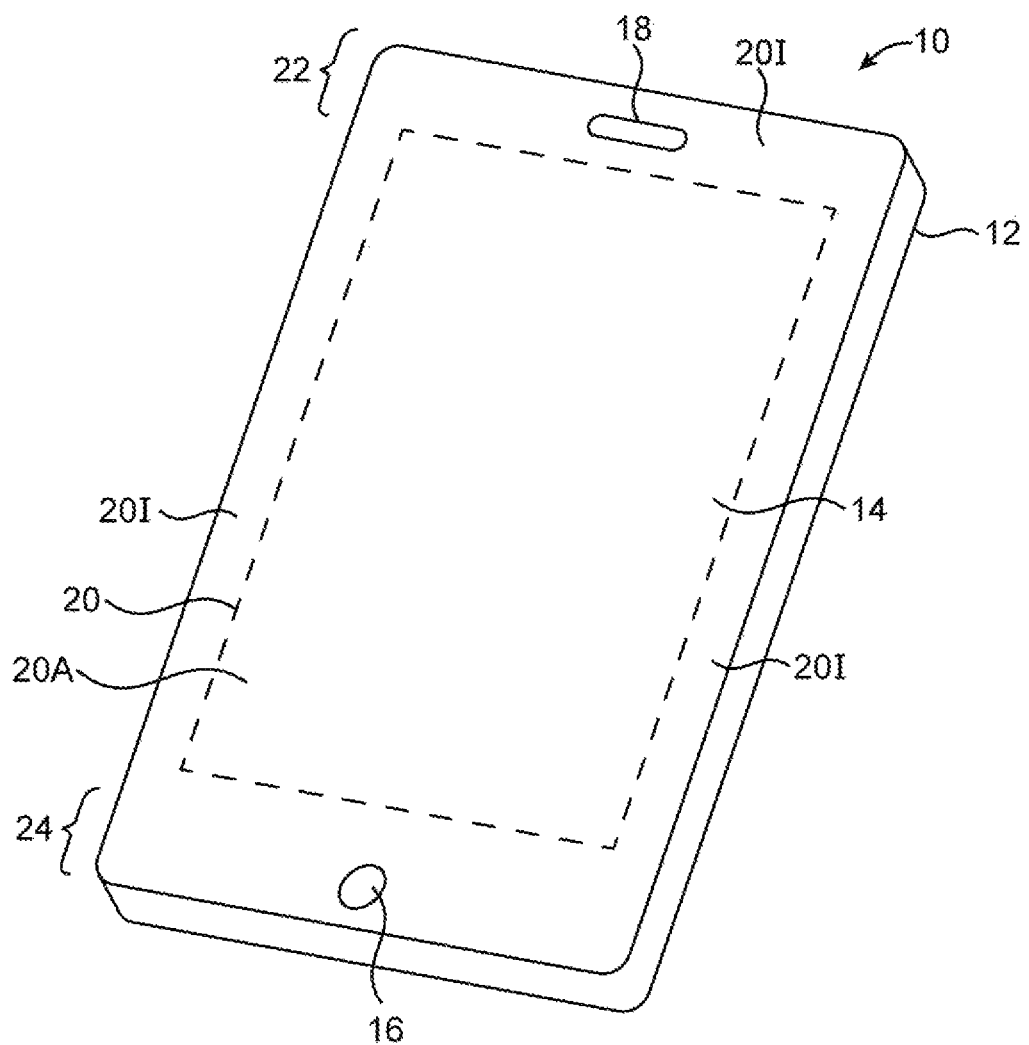
FIG. 1 is a perspective view of an illustrative electronic device with wireless communications circuitry having multiple antennas in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a cellular telephone, a media player, a wrist-watch device, pendant device, headphone device, earpiece device, or other wearable or miniature device, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover either a first subset of bands or a second subset of bands and thereby cover all bands of interest.

Figure 2:
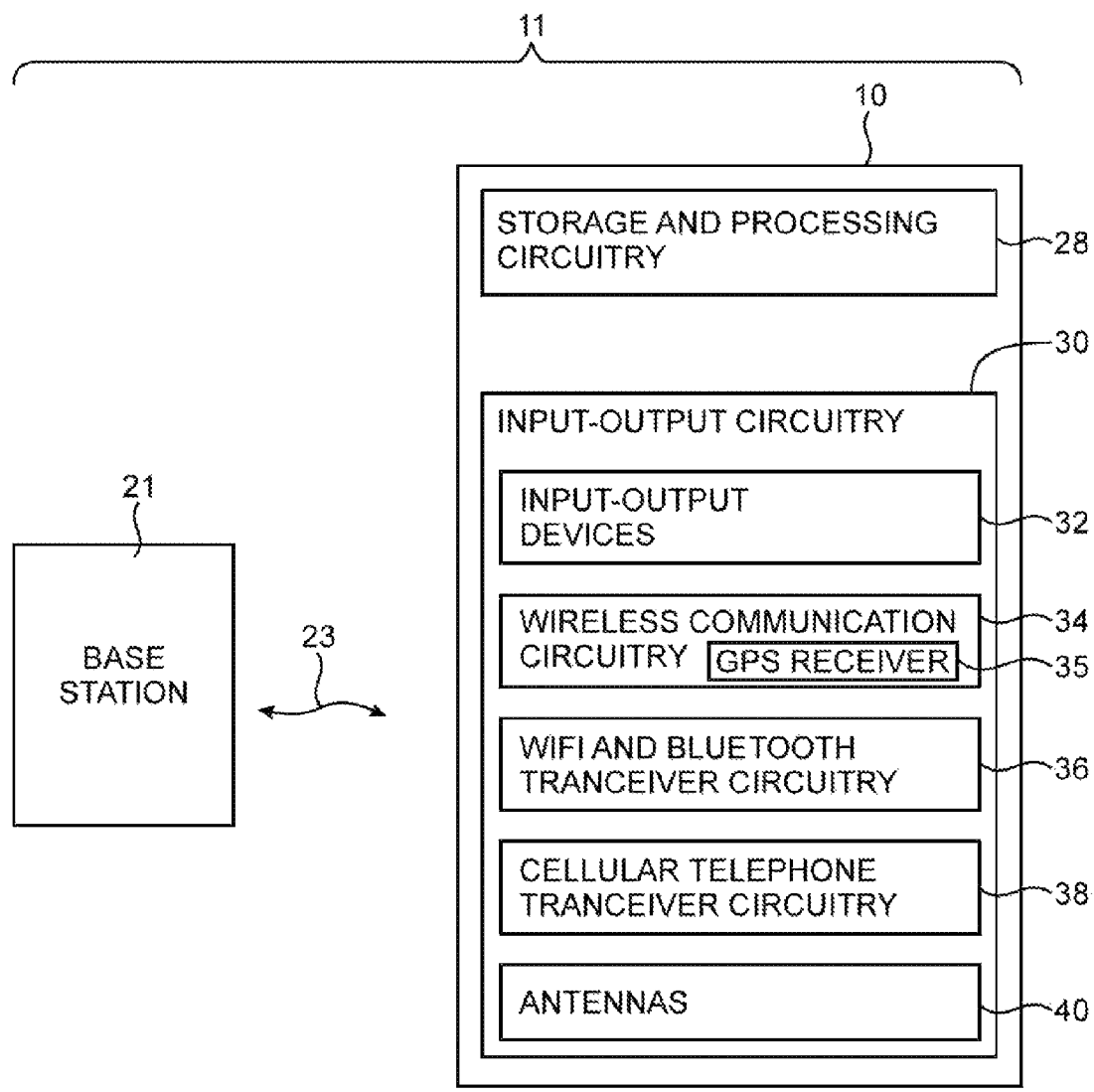
FIG. 2 is a schematic diagram of a wireless network including a base station and an illustrative electronic device with wireless communication circuitry having multiple antennas in accordance with an embodiment of the present invention.

A schematic diagram of a system in which electronic device 10 may operate is shown in FIG. 2. As shown in FIG. 2, system 11 may include wireless network equipment such as base station 21 (sometimes referred to as a base transceiver station). Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, the "4G" Long Term Evolution (LTE) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received traffic channel signals, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna is used. Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, accelerometers (motion sensors), ambient light sensors, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

In some embodiments of the present invention, device 10 may be described that supports the circuit switching technology and packet switching technology. Circuit switching involves establishing a dedicated/exclusive communications channel through a network before any user data is transmitted. A channel established using circuit switching guarantees the full bandwidth of the channel and remains connected for the entire duration of the session (e.g., the channel remains unavailable to other users until the session is terminated and the channel is released).

Traditionally, the Public Switched Telephone Network (PTSN) is implemented using circuit switching. Device 10 may include a baseband processing circuit configured to support circuit switching technologies such as the "3G" CDMA2000 1xRTT (sometimes referred to herein as "1x") cellular telephone communications technology, the "3G" Universal Mobile Telecommunications System (UMTS) cellular telephone communications technology, and the "2G" GSM cellular telephone communications technology (as examples). The baseband processing circuit that is being operated to support circuit switching cellular telephone communications protocols may therefore sometimes be referred to as a "voice" modem.

Packet switching involves organizing data to be transmitted into groups referred to as packets in accordance with the Internet Protocol (IP). Each packet may contain the IP address of the source node, the IP address of the destination node, user data (often referred to as data load or payload), and other control information. Unlike circuit switching, packet switching shares available network resources among multiple users. Each packet being sent may be routed independently to the desired destination, and as a result, each packet may experience varying packet transfer delays. Packets arriving at the destination node may be buffered until all the packets have arrived. Once a sufficient number of packets have reached their destination, the packets can be reassembled to recover the original transmitted data at the source.

The Internet and most local area networks rely on packet switching. Device 10 may include a baseband processing circuit configured to support packet switching technologies such as the "3G" Evolution-Data Optimized (sometimes referred to herein as "EV-DO") radio access technology, the "4G" LTE radio access technology, the "3G" High Speed Packet Access (HSPA) radio access technology, the "2G" Enhanced Data Rates for GSM Evolution (EDGE) radio access technology, and the "2G" General Packet Radio Service (GPRS) radio access technology (as examples). The baseband processing circuit that is being operated to support packet switching radio access technologies may therefore sometimes be referred to as a "data" modem.

Figure 3:
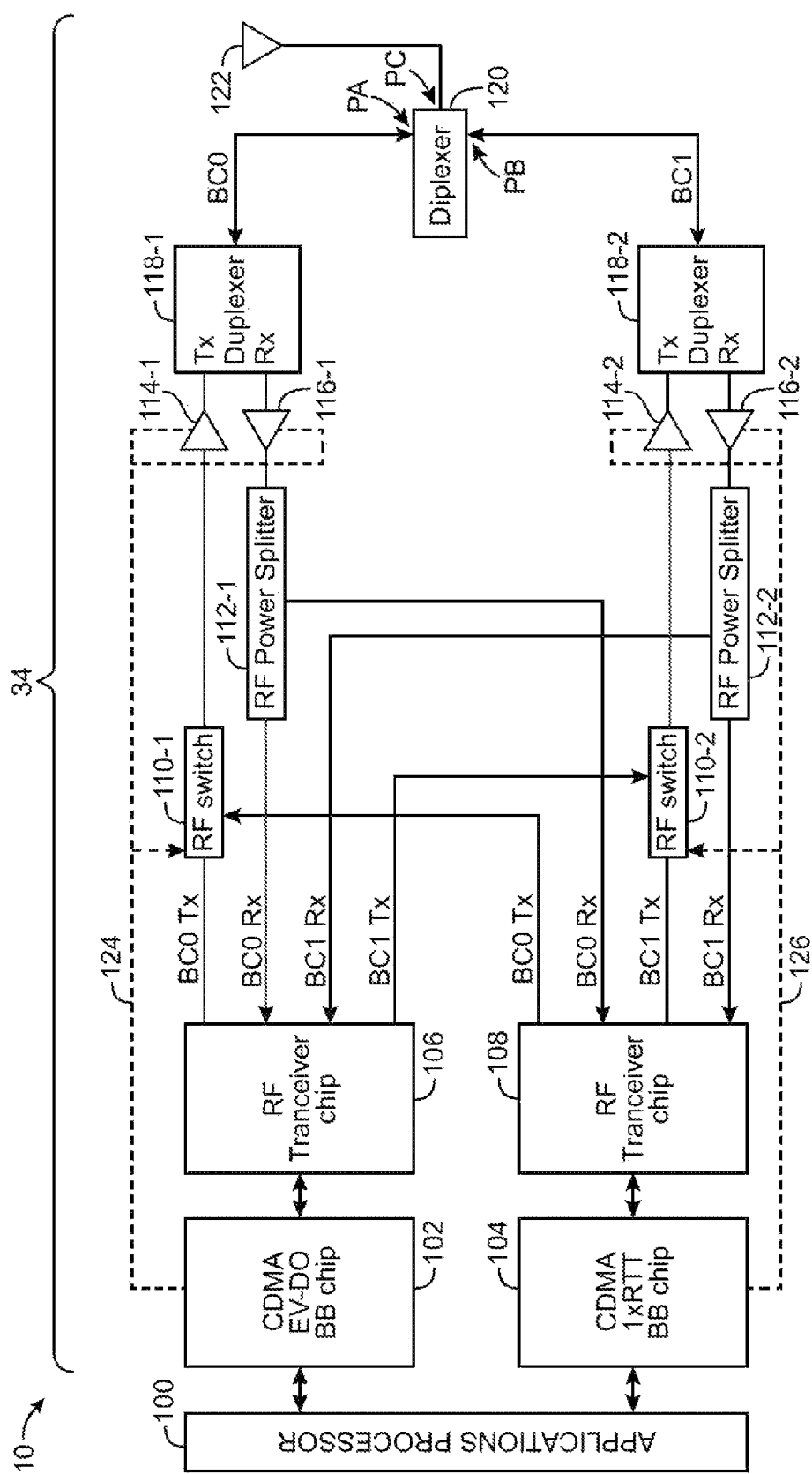
FIG. 3 is a diagram of illustrative wireless communications circuitry having radio-frequency power splitters in accordance with an embodiment of the present invention.

In one suitable arrangement of the present invention, device 10 may include a first baseband processing circuit 102 that is used exclusively (or primarily) for handling packet switched "data" traffic and a second baseband processing circuit 104 that is used exclusively (or primarily) for handling circuit switched "voice" traffic (see, e.g., FIG. 3). First and second baseband processing circuits 102 and 104 may be separate integrated circuits that are mounted on a printed circuit board secured within housing 12 of device 10. In the example of FIG. 3, first baseband processor 102 is shown to support the CDMA EV-DO radio access technology, whereas second baseband processor 104 is shown to support the CDMA 1xRTT (1x) radio access technology. The use of device 10 that supports two radio access technologies such as EV-DO and 1x radio access technologies is merely illustrative. If desired, processors 102 and 104 and additional baseband processing circuits within device 10 may be configured to support other radio access technologies.

Baseband processors 102 and 104 may be coupled to a common control circuit such as applications processor 100. Baseband processors 102 and 104 may be part of wireless circuitry 34, whereas applications processor 100 may be part of storage and processing circuitry 28. Baseband processors 102 and 104 may provide data traffic and voice traffic to applications processor 100 via respective paths. In addition to the transmitted user data, processors 102 and 104 may also provide applications processor 100 with information on whether responses (acknowledgements) are being received from a cellular telephone tower corresponding to requests from device 10, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by applications processor 100 and/or processors 102 and 104 and, in response, baseband processors 102 and 104 (or, if desired, applications processor 100) may issue control commands for controlling wireless circuitry 34. For example, baseband processors 102 and 104 may issue control commands over paths 124 and 126, respectively.

Baseband processor 102 may be coupled to a corresponding radio-frequency transceiver circuit 106. Transceiver 106 may be configured to implement the same radio access technology as its associated baseband processor (e.g., transceiver 106 may be configured to support the EV-DO radio access technology). Baseband processor 104 may be coupled to a corresponding radio-frequency transceiver circuit 108. Transceiver 108 may be configured to implement the same radio access technology as its associated baseband processor (e.g., transceiver 108 may be capable of supporting the 1x radio access technology).

The exemplary radio architecture of FIG. 3 shows the use of a single antenna 122 for supporting wireless transmission/reception across two frequency bands. When referring to CDMA radio access technology, the different frequency bands may be assigned a respective band class. Device 10 may, for example, be configured to support wireless operation in a first band class BC0 and a second band class BC1. In this example, each transceiver chip may therefore include at least two transmit (Tx) ports (one for each band class) and at least two receive (Rx) ports.

As shown in FIG. 3, transceiver 106 may have a first transmit port (BC0 Tx) over which data to be transmitted in BC0 may be provided, a second transmit port (BC1 Tx) over which data to be transmitted in BC1 may be provided, a first receive port (BC0 Rx) through which data received in BC0 may arrive, and a second receive port (BC1 Rx) through which data received in BC1 may arrive. Wireless circuitry 34 may include a first radio-frequency (RF) switch 110-1 and a second radio-frequency switch 110-2. Radio-frequency switch 110-1 may have a first input that is coupled to the first transmit port of transceiver 106, a second input that is coupled to the first transmit port of transceiver 108, a control input, and an output. The control input of switch 110-1 may receive control signals from baseband processor 102 via path 124 to selectively route transmit signals from one of its first and second inputs to its output (e.g., switch 110-1 may be configured to connect its first input to its output when transmitting data traffic in BC0 or may be configured to connect its second input to its output when transmitting voice traffic in BC0).

Radio-frequency switch 110-2 may have a first input that is coupled to the second transmit port of transceiver 106, a second input that is coupled to the second transmit port of transceiver 108, a control input, and an output. The control input of switch 110-2 may receive control signals from baseband processor 104 via path 126 to selectively route transmit signals from one of its first and second inputs to its output (e.g., switch 110-2 may be configured to connect its first input to its output when transmitting data traffic in BC1 or may be configured to connect its second input to its output when transmitting voice traffic in BC1).

Radio-frequency signals presented at the output of RF switch 110-1 may be amplified by a first amplifying circuit such as power amplifier 114-1. The amplified radio-frequency signal may be fed to a first (Tx) port of duplexer 118-1. A duplexer is a device operable to allow bidirectional transmission in a single frequency channel within the desired band class (e.g., a duplexer serves to isolate the Tx path from the Rx path while sharing a common antenna). Duplexer 118-1 may have a second (Rx) port and a third input-output port that is coupled to antenna 122. The Rx port of Duplexer 118-1 may be coupled to an RF power splitter 112-1 via a second amplifying circuit such as low noise amplifier 116-1. Power splitter 112-1 may have a first output that is coupled to the first receive port of transceiver 106 and a second output that is coupled to the first receive port of transceiver 108.

Radio-frequency signals presented at the output of RF switch 110-2 may be amplified by a third amplifying circuit such as power amplifier 114-2. This amplified radio-frequency signal may be fed to a first (Tx) port of duplexer 118-2. Duplexer 118-2 may have a second (Rx) port and a third input-output port that is coupled to antenna 122. The Rx port of Duplexer 118-2 may be coupled to an RF power splitter 112-2 via a fourth amplifying circuit such as low noise amplifier 116-2. Power splitter 112-2 may have a first output that is coupled to the second receive port of transceiver 106 and a second output that is coupled to the second receive port of transceiver 108.

The third port of duplexers 118-1 and 118-2 may be coupled to a shared antenna 122 via diplexer 120. A diplexer may be a passive device configured to perform frequency-based multiplexing. In particular, diplexer 120 may include a first port PA that is coupled to the third port of duplexer 118-1 and that is operable to convey signals in a first frequency band (e.g., band class BC0), a second port PB that is coupled to the third port of duplexer 118-2 and that is operable to convey signals in a second frequency band (e.g., band class BC1) that is different than the first frequency band, and a third port PC that is connected to antenna 122. The wireless circuitry described herein that is coupled between the transceiver circuitry and antenna 122 (e.g., the RF switches, power splitters, power amplifiers, low noise amplifiers, duplexers, diplexers, etc.) may collectively be referred to as radio-frequency front-end circuitry.

The signals associated with PA and PB can coexist on port PC without suffering from interference. Consider a scenario in which BC0 is lower in frequency than BC1. In this scenario, diplexer 120 may include a low-pass filter coupling ports PA and PC and a high-pass filter coupling ports PB and PC. Radio-frequency signals transmitted in BC0 may be conveyed between ports PA and PC with minimal power loss and leakage into port PB, whereas radio-frequency signals transmitted in BC1 may be conveyed between ports PB and PC with minimal power loss and leakage into port PA.

Antenna 122 may be capable of transmitting radio-frequency signals in BC0 from a selected one of transceivers 106 and 108 (depending on the state of switch 110-1) and transmitting radio-frequency signals in BC1 from a selected one of transceivers 106 and 108 (depending on the state of switch 110-2). Signals in BC0 and BC1 may be radiated in parallel using antenna 122, if desired. The gain provided by power amplifier 114-1 may be controlled via control signals conveyed over path 124 from baseband processor 102. Similarly, the gain provided by power amplifier 114-2 may be controlled via control signals conveyed over path 126 from baseband processor 104.

Transceiver 106 may receive RF signals in BC0 via power splitter 112-1 or may receive RF signals in BC1 via power splitter 112-2. Transceiver 108 may receive RF signals in BC0 via power splitter 112-1 or may receive RF signals in BC1 via power splitter 112-2. Radio-frequency power splitters 112-1 and 112-2 may be used to split the signals received via the associated low noise amplifiers into multiple reduced-power versions (e.g., the reduced-power version may experience 3 dB power loss). The reduced-power versions of the received signals generated at the outputs of power splitter 112-1 may be fed to the first received port of transceiver 106 and the first receive port of transceiver 108, whereas the reduced-power versions of the received signals generated at the outputs of power splitter 112-2 may be fed to the second receive port of transceiver 106 and the second receive port of transceiver 108. Low noise amplifiers 116-1 and 116-2 may be used to compensate for this reduction in power. The gain of low noise amplifier 116-1 may be controlled via control signals generated from baseband processor 102 via path 124, whereas the gain of low noise amplifier 116-2 may be controlled via control signals generated from baseband processor 104 via path 126.

The radio architecture of FIG. 3 having RF power splitters and low noise amplifiers in the receive path is merely illustrative and does not serve to limit the scope of the present invention. If desired, the portion of the RF front-end circuitry that is used for wireless reception may be replicated to support operation of an additional antenna (not shown for clarity) to support receive diversity or other desired antenna reception schemes.

Figure 4:
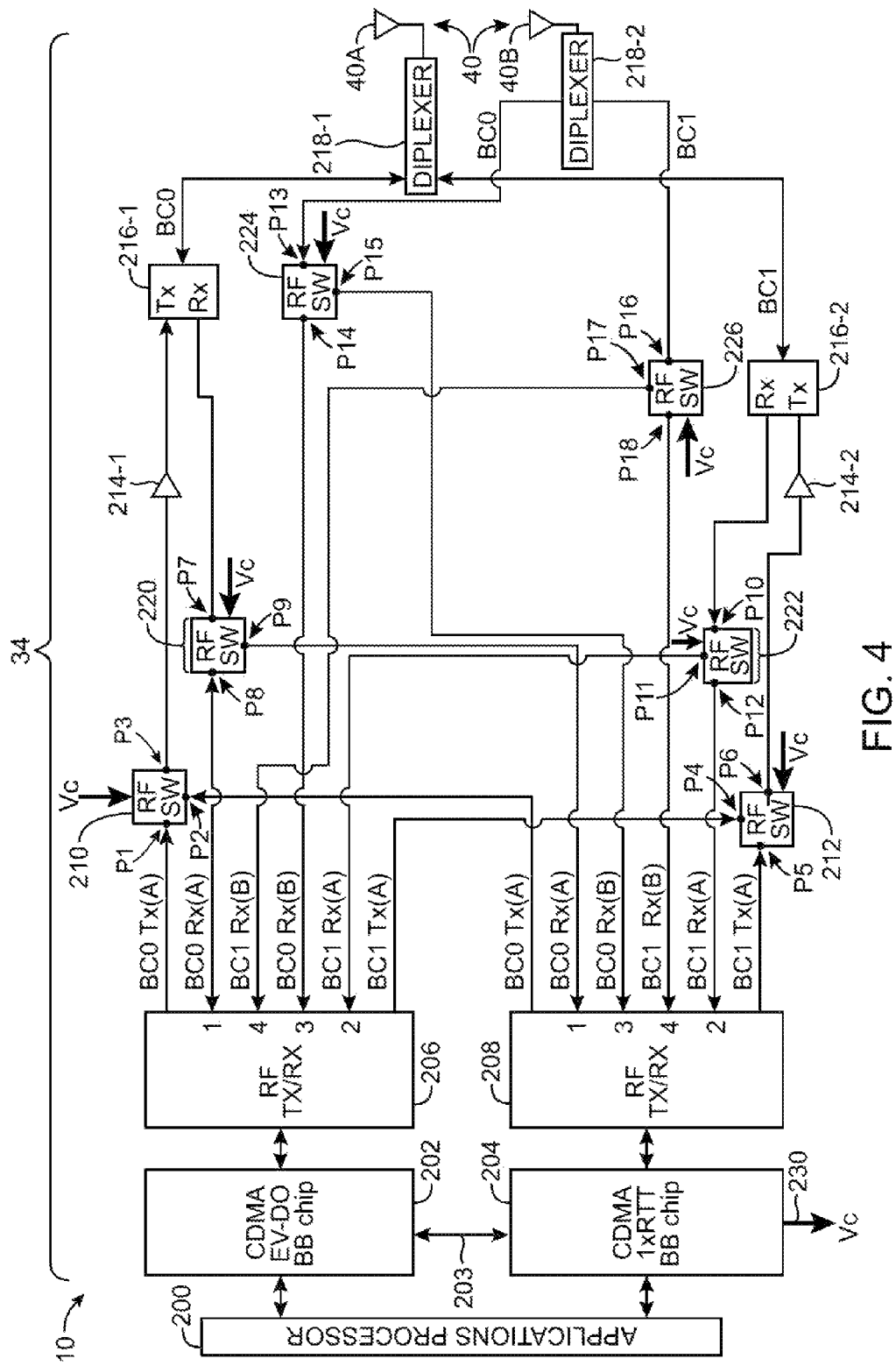
FIG. 4 is a diagram of illustrative wireless communications circuitry having primarily radio-frequency switches in accordance with an embodiment of the present invention.

In another suitable arrangement of the present invention, wireless circuitry 34 of device 10 may include RF switches in the receive path in place of power splitters (see, e.g., FIG. 4). The use of RF switches instead of power splitters may eliminate the need for the low noise amplifiers (because RF switches do not introduce a 3 dB signal loss). As shown in FIG. 4, device 10 may include a first baseband processing circuit 202 that is used exclusively (or primarily) for handling packet switched "data" traffic and a second baseband processing circuit 204 that is used exclusively (or primarily) for handling circuit switched "voice" traffic. First and second baseband processors 202 and 204 may be separate integrated circuits that are mounted on a printed circuit board secured within housing 12 of device 10. In the example of FIG. 4, first baseband processor 202 is shown to support the CDMA EV-DO radio access technology, whereas second baseband processor 204 is shown to support the CDMA 1xRTT (1x) radio access technology. Processor 202 may therefore be referred to herein as the EV-DO processor, whereas processor 204 may be referred to herein as the 1x processor. The use of device 10 that supports two radio access technologies such as EV-DO and 1x radio access technologies is merely illustrative. If desired, processors 202 and 204 and additional baseband processing circuits within device 10 may be configured to support other radio access technologies.

Baseband processors 202 and 204 may be coupled to a common control circuit such as applications processor 200. Baseband processors 202 and 204 may be part of wireless circuitry 34, whereas applications processor 200 may be part of storage and processing circuitry 28. Control signals may be conveyed between baseband processors 202 and 204 via a general purpose input-output (GPIO) path 203. For example, information such as the state of each of the RF switches and information related to the current operating modes of the baseband processors (e.g., whether each of the baseband processors are in sleep mode, wake mode, or traffic mode) may be shared between processors 202 and 204 so that proper reception may be coordinated.

As described previously, baseband processor 202 may be used in handling EV-DO data streams, whereas baseband processor 204 may be used in handling 1x voice signal streams. Baseband processors 202 and 204 may transmit and receive radio-frequency signals via antennas 40 (e.g., a primary antenna 40A and a secondary antenna 40B).

To avoid missing incoming 1x calls, a 1x paging channel may be monitored once per 1x paging cycle for a first predetermined time period sometimes referred to as a 1x wake period. The 1x page monitoring operations can be performed by temporarily using at least one of antennas 40, or if channel conditions are bad, both of antennas 40 may be used. Device 10 may monitor receive signal strength levels associated with each of antennas 40 (e.g., by obtaining bit error rate measurements, signal-to-noise ratio measurements, RSSI measurements, RSCP measurements, SINR and SNR measurements, and other desired radio-frequency measurements for signals received through each of antennas 40). The antenna exhibiting the greater receive signal strength may be selected for use in monitoring the 1x paging channel and for establishing a call if a paging signal is detected. If a paging signal is detected, a call may be established. During a voice call session, the other antenna that is currently switched out of use may not be used to monitor for EV-DO pages. In other suitable embodiments, the other inactive antenna may be configured to support active data streaming during a call session.

The EV-DO paging channel may also be monitored once per EV-DO paging cycle for a second predetermined time period sometimes referred to as an EV-DO wake period. The EV-DO page monitoring operations can be performed by temporarily using both of antennas 40 (as an example). The simultaneous use of two antennas to receive two EV-DO data streams (a type of arrangement that is sometimes referred to as receiver diversity or receive diversity) helps to improve data rates.

Device 10 may continuously monitor receive signal strength levels associated with each of antennas 40. If an EV-DO paging signal is detected, an active EV-DO data session may be established. If an active data session extends into a 1x paging cycle, a selected one of antennas 40 may be used for monitoring the 1x paging channel while the other of antennas 40 continues receiving EV-DO data. For example, the antenna exhibiting higher receive signal quality may be used for monitoring the 1x paging channel (e.g., the 1x baseband processor has receive priority over the EV-DO processor). If a 1x paging signal is detected, a call may be established and the other antenna may be switched out of use (i.e., the EV-DO data session may be temporarily put on hold). If desired, the other antenna may be allowed to continue supporting active data streaming during the call.

In such types of reception scheme in which receive path routing is performed primarily via radio-frequency switches instead of power splitters, care needs to be taken to ensure that the 1x wake periods and the EV-DO wake periods are non-conflicting and non-overlapping. This allows 1x wakeup and EV-DO wakeup to be performed using both antennas 40 if channel conditions are bad. The 1x wake periods may occur at predetermined time intervals (once per 1x paging cycle). Device 10 may be capable of controlling when the EV-DO wake periods occur. It may therefore be desirable to space the 1x and EV-DO wake periods as far apart from one another as possible to minimize the probability of conflicts/overlaps.

The radio architecture of FIG. 4 may be operated such that wake periods of the different baseband processors are spaced sufficiently apart. Baseband processor 202 may be coupled to a corresponding radio-frequency transceiver circuit 206. Transceiver circuit 206 may be configured to implement the same radio access technology as its associated baseband processor (e.g., transceiver circuit 206 may be capable of handling the EV-DO radio access technology). Baseband processor 204 may be coupled to a corresponding radio-frequency transceiver circuit 208. Transceiver circuit 208 may be configured to implement the same radio access technology as its associated baseband processor (e.g., transceiver circuit 208 may be capable of handling the 1x radio access technology).

The exemplary radio architecture of FIG. 4 shows the use of two antennas (i.e., antenna 40A and 40B) each of which can be used for supporting wireless transmission/reception across two frequency bands. In this particular example in which device 10 operates using the CDMA radio access technology, each of antennas 40A and 40B may be used to provide wireless service in band classes BC0 and BC1. Antenna 40A (e.g., the primary antenna) may be used for transmitting and receiving radio-frequency signals, whereas antenna 40B (e.g., the secondary antenna) may only be used for receiving radio-frequency signals. Antenna 40B may therefore be referred to as a diversity antenna and may be switched into use when the signal level associated with antenna 40A is weak. Each transceiver chip may therefore include at least two transmit (Tx) ports (one for each band class for antenna 40A) and at least four receive (Rx) ports (one for each band class for each of the two antennas).

As shown in FIG. 4, transceiver 206 may have a first transmit port (BC0 Tx(A)) over which data to be transmitted in BC0 via antenna 40A may be provided, a second transmit port (BC1 Tx(A)) over which data to be transmitted in BC1 via antenna 40A may be provided, a first receive port (BC0 Rx(A)) through which data received in BC0 via antenna 40A may be fed, a second receive port (BC1 Rx(A)) through which data received in BC1 via antenna 40A may be fed, a third receive port (BC0 Rx(B)) through which data received in BC0 via antenna 40B may be fed, and a fourth receive port (BC1 Rx(B)) through which data received in BC1 via antenna 40B may be fed. Similarly, transceiver 208 may have a first transmit port (BC0 Tx(A)) over which data to be transmitted in BC0 via antenna 40A may be provided, a second transmit port (BC1 Tx(A)) over which data to be transmitted in BC1 via antenna 40A may be provided, a first receive port (BC0 Rx(A)) through which data received in BC0 via antenna 40A may be fed, a second receive port (BC1 Rx(A)) through which data received in BC1 via antenna 40A may be fed, a third receive port (BC0 Rx(B)) through which data received in BC0 via antenna 40B may be fed, and a fourth receive port (BC1 Rx(B)) through which data received in BC1 via antenna 40B may be fed.

Wireless circuitry 34 may include radio-frequency switches 210, 212, 220, 222, 224, and 226 (e.g., single-pole double-throw radio-frequency switches), power amplifier 214-1 formed in the BC0 transmit path, power amplifier 214-2 formed in the BC1 transmit path, duplexer 216-1 associated with transceiver 206, duplexer 216-2 associated with transceiver 208, diplexer 218-1 associated with antenna 40A, and diplexer 218-2 associated with antenna 40B. In particular, switch 210 may have port P1 that is coupled to the first transmit port (BC0 Tx(A)) of transceiver 206, port P2 that is coupled to the first transmit port (BC0 Tx(A)) of transceiver 208, and port P3 that is coupled to the Tx port of duplexer 216-1 via power amplifier 214-1. The state of switch 210 may be controlled using a control signal generated using baseband processor 204 (e.g., using signal Vc provided over path 230). Depending on the value of Vc, port P3 may be coupled to a selected one of ports P1 and P2 (e.g., only one of transceivers 206 and 208 may transmit signals in BC0 via antenna 40A at any given point in time).

Similarly, switch 212 may have port P4 that is coupled to the second transmit port (BC1 Tx(A)) of transceiver 206, port P5 that is coupled to the second transmit port (BC1 Tx(A)) of transceiver 208, and port P6 that is coupled to the Tx port of duplexer 216-2 via power amplifier 214-2. The state of switch 212 may be controlled using control signal Vc generated using baseband processor 204. Depending on the value of Vc, port P6 may be coupled to a selected one of ports P4 and P5 (e.g., only one of transceivers 206 and 208 may transmit signals in BC1 via antenna 40A at any given point in time).

Radio-frequency switch 220 may have port P8 that is coupled to the first receive port (BC0 Rx(A)) of transceiver 206, port P9 that is coupled to the first received port (BC0 Rx(A)) of transceiver 208, and port P7 that is coupled to the Rx port of duplexer 216-1. The state of switch 220 may be controlled using control signal Vc. Depending on the value of Vc, port P7 may be coupled to a selected one of ports P8 and P9 (e.g., signals received in BC0 via antenna 40A can only be passed to one of transceivers 206 and 208 at any given point in time).

Similarly, radio-frequency switch 222 may have port P11 that is coupled to the second receive port (BC1 Rx(A)) of transceiver 206, port P12 that is coupled to the second received port (BC1 Rx(A)) of transceiver 208, and port P10 that is coupled to the Rx port of duplexer 216-2. The state of switch 222 may be controlled using control signal Vc. Depending on the value of Vc, port P10 may be coupled to a selected one of ports P11 and P12 (e.g., signals received in BC1 via antenna 40A can only be passed to one of transceivers 206 and 208 at any given point in time).

Duplexers 216-1 and 216-2 may each have an input-output port that is coupled to antenna 40A via diplexer 218-1. Diplexer 218-1 may be a passive device configured to perform frequency-based multiplexing for radio-frequency signals transmitted/received in BC0 and BC1 via antenna 40A (e.g., RF signals in BC0 may be passed through duplexer 216-1, whereas RF signals in BC1 may be passed through duplexer 216-2).

Unlike antenna 40A, antenna 40B may only be used for receiving incoming radio-frequency signals. If desired, the front-end circuitry of wireless circuitry 34 could be configured so that antenna 40B supports wireless transmission. Radio-frequency switches 224 and 226 may be interposed in the receive path associated with antenna 40B. In particular, switch 224 may have port P14 that is coupled to the third receive port (BC0 Rx(B)) of transceiver 206, port P15 that is coupled to the third receive port (BC0 Rx(B)) of transceiver 208, and port P13 that is coupled to antenna 40B via diplexer 218-2. The state of switch 224 may be controlled using control signal Vc that is generated using baseband processor 204. Depending on the value of Vc, port P13 may be coupled to a selected one of ports P14 and P15 (e.g., signals received in BC0 using antenna 40B can only be passed to one of transceivers 206 and 208 at any given point in time).

Similarly, radio-frequency switch 226 may have port P17 that is coupled to the fourth receive port (BC1 Rx(B)) of transceiver 206, port P18 that is coupled to the fourth received port (BC1 Rx(B)) of transceiver 208, and port P16 that is coupled to antenna 40B via diplexer 218-2. The state of switch 224 may be controlled using control signal Vc. Depending on the value of Vc, port P16 may be coupled to a selected one of ports P17 and P18 (e.g., signals received in BC1 using antenna 40B can only be passed to one of transceivers 206 and 208 at any given point in time). Diplexer 218-2 may be a passive device that is configured to perform frequency-based multiplexing for radio-frequency signals transmitted/received in BC0 and BC1 via antenna 40B (e.g., RF signals received in BC0 may be fed to switch 224, whereas RF signals received in BC1 may be fed to switch 226).

The radio architecture shown and described in connection with FIG. 4 is merely illustrative and does not serve to limit the scope of the present invention. If desired, device 10 may include more than two antennas each of which is capable of transmitting and/or receiving radio-frequency signals in any suitable number of frequency bands. The states of the radio-frequency switches (i.e., switches 210, 212, 220, 222, 224, and 226) may also be partly controlled using signals generated from baseband processor 204 or using signals generated from applications processor 200, if desired.

Figure 5:
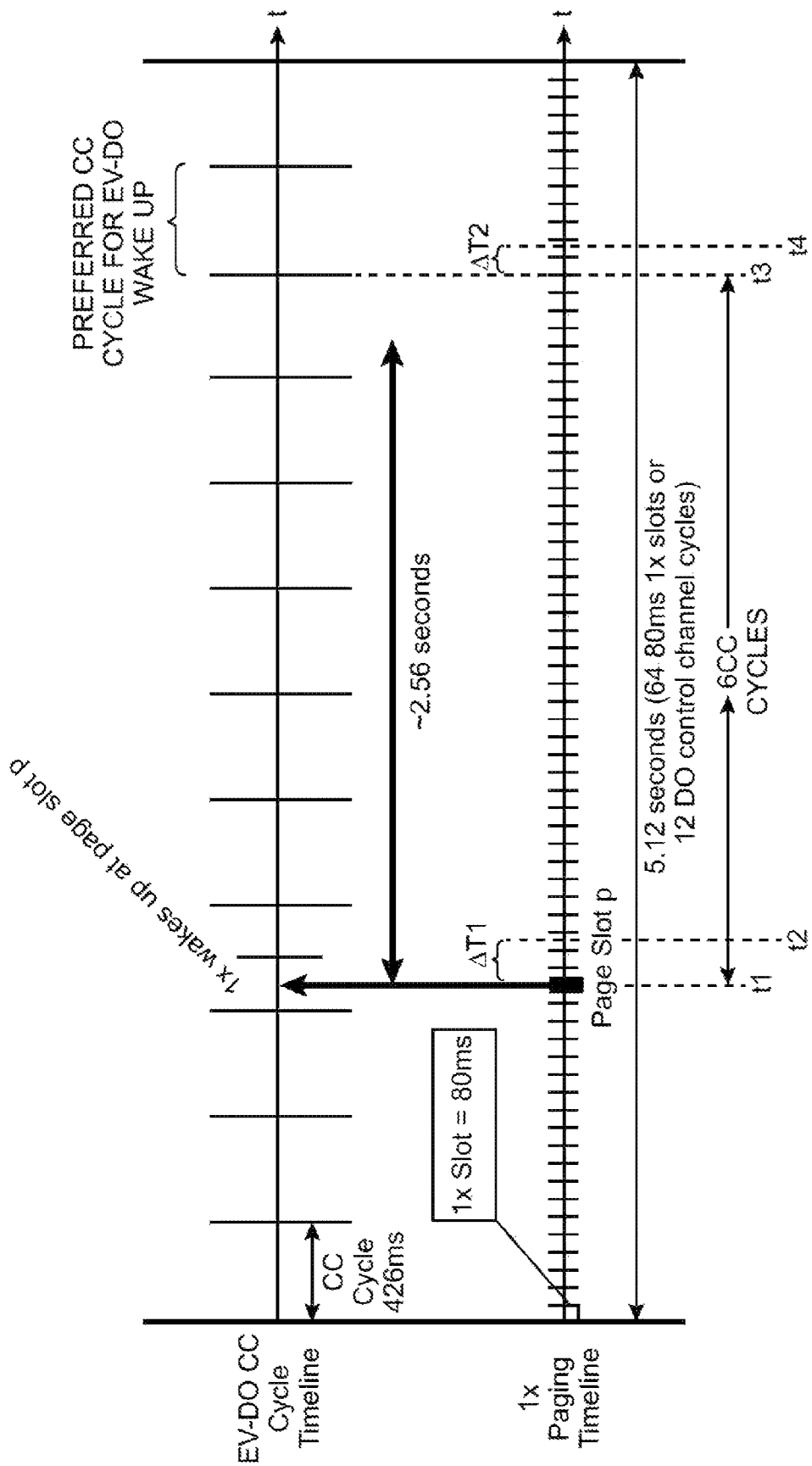
FIG. 5 is a timing diagram showing an illustrative wakeup scheduling scheme for the two baseband processing circuits of FIG. 4 in accordance with an embodiment of the present invention.

FIG. 5 is a timing diagram showing an illustrative schedule for the wake periods associated with baseband processors 202 and 204 (e.g., an exemplary schedule for avoiding collision between the EV-DO wake period and the 1x wake period). The 1x baseband processor may be configured to periodically wake up according to a predetermined schedule. As shown in the example of FIG. 5, the 1x wake period may occur once per 1x paging cycle. For example, if each paging cycle includes 64 1x paging slots, processor 204 may wake up once every 5.12 seconds (assuming each 1x paging slot is equal to 80 ms). The 1x wake period $\Delta T1$ (from time t1 to t2) may last at least one 1x paging slot, less than one 1x paging slot, or greater than one 1x paging slot. The particular paging slot (page slot p) during which the 1x processor wakes up may be derived from an International Mobile Subscriber Identity (IMSI), an identifier that is unique to each device 10. As a result, the position of the 1x paging slot does not change often, which simplifies the scheduling for the EV-DO wake period.

The operation of the EV-DO processor may be grouped into control channel (CC) cycles, each of which has a duration of 426 ms (as an example). In this example, one 1x paging slot includes 12 CC cycles (e.g., the 1x processor may wake up once every 12 EV-DO CC cycles). As a result, the EV-DO paging cycle may include 12 CC cycles. Device 10 may choose a selected one of every 12 CC cycles as a preferred control channel cycle (PCCC) during which the EV-DO processor awakes from sleep mode. The preferred CC cycle may be chosen during EV-DO session negotiation operations. The EV-DO wake period $\Delta T2$ (from time t3 to t4) may last less than one CC cycle or more than one CC cycle.

To ensure that the 1x and EV-DO wake periods do not collide, the preferred CC cycle may be chosen such that the EV-DO processor wakes up six CC cycles after the 1x paging slot (e.g., the preferred CC cycle may be offset by a half 1x paging cycle relative to the 1x page slot). Positioning the EV-DO approximately at the midpoint between two successive 1x paging slots may effectively minimize the probability of the EV-DO and 1x wake periods overlapping.

During 1x wake periods, antenna 40A may be switched into use while antenna 40B is switched out of use (as an example), or if channel conditions are bad both antenna 40A and antenna 40B may be switched into use. For example, 1x processor 204 may be used to configure switch 210 so that ports P2 and P3 are connected, to configure switch 212 so that ports P5 and P6 are connected, to configure switch 220 so that ports P7 and P9 are connected, and to configure switch 222 so that ports P10 and P12 are connected (e.g., by sending appropriate control signals Vc via path 230). The state of switches 224 and 226 are irrelevant since the corresponding receive ports associated with antenna 40B are not in use.

During EV-DO wake periods, antenna 40A and/or antenna 40B may be switched in use. For example, 1x processor 204 may be used to configure switch 210 so that ports P1 and P3 are connected, to configured switch 212 so that ports P4 and P6 are connected, to configure switch 220 so that ports P7 and P8 are connected, to configure switch 222 so that ports P10 and P11 are connected, to configure switch 224 so that ports P13 and P14 are connected, and to configure switch 226 so that ports P16 and P17 are connected (e.g., by sending appropriate control signals Vc via path 230). In this scenario, all the radio-frequency switches are configured such that antennas 40A and 40B are routed to transceiver 206 associated with EV-DO baseband processor 202.

Figure 6:
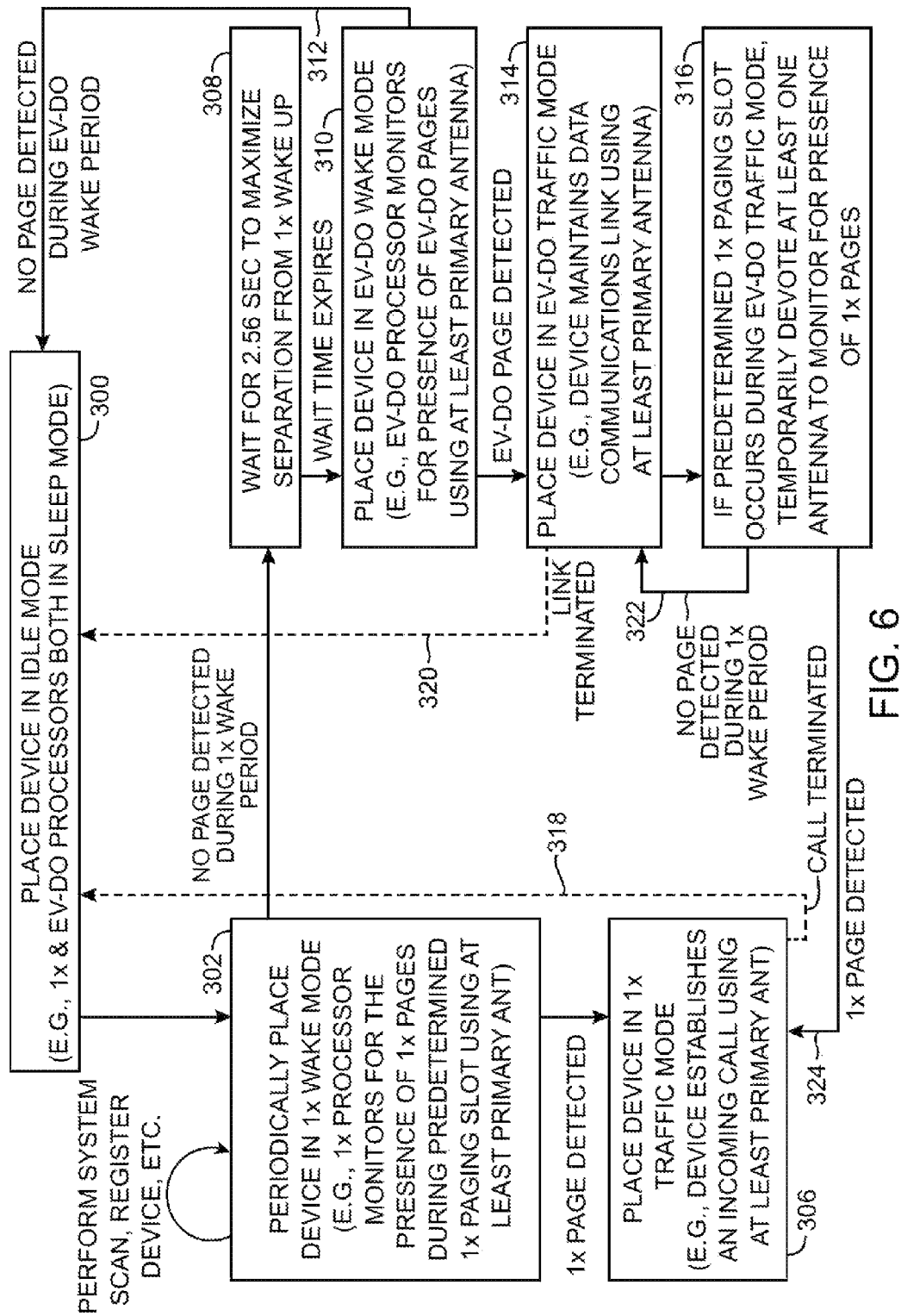
FIG. 6 is a flow chart of illustrative steps for operating the wireless communications circuitry of the type shown in FIG. 4 in accordance with an embodiment of the present invention.

FIG. 6 shows illustrative steps involved in operating device 10 having wireless circuitry of the type described in connection with FIG. 4. At step 300, device 10 may be placed in an idle mode (e.g., a mode in which both 1x and EV-DO processors are in sleep state). Device 10 may be periodically placed in 1x wake mode (step 302). At step 302, 1x processor 204 may wake up from the sleep state for a predetermined 1x wake period. During the 1x wake period, 1x processor 204 may be configured to monitor for the presence of 1x pages using at least antenna 40A. The 1x wake period is typically less than a half 1x paging cycle (e.g., the 1x wake period is typically less than 2.56 seconds). The 1x wake period may be extended to longer than a half 1x paging cycle when device 10 needs to perform system scan (when device 10 loses service) or when device 10 needs to re-register with the network (upon detecting an active serving network), as examples. If the 1x wake period goes beyond 2.56 seconds, the EV-DO wakeup may be blocked. In such scenarios, 1x processor 204 may send signals to EV-DO processor 202 via GPIO path 203 that prevents processor 202 from awaking from sleep mode.

If a 1x page is detected during the 1x wake period, device 10 may be placed in an active call mode (e.g., device 10 may establish an incoming phone call using at least antenna 40A) to handle voice traffic. The call may have any desired duration, assuming service is not interrupted by external environmental factors. Upon termination of the call, processing may loop back to step 300 (as indicated by path 318).

If a 1x page is not detected during the 1x wake period, device 10 may proceed to wait for a half 1x paging cycle (e.g., a predetermined amount of time that is approximately halfway in time between successive 1x page slots). For example, device 10 may wait for 2.56 seconds to ensure that the EV-DO wake period is sufficiently spaced apart from the 1x wake periods (step 308). Upon expiration of the predetermined wait time, device 10 may be placed in EV-DO wake mode. During the EV-DO wake period (step 310), EV-DO processor 202 may be configured to monitor for the presence of EV-DO pages using at least antenna 40A (or antenna 40B). If no EV-DO page is detected, processing may loop back to step 300 (as indicated by path 312).

If an EV-DO page is detected during the EV-DO wake period, step 314 may be performed. At step 314, device 10 may establish an active data session (e.g., device 10 may establish a data communications link using at least antenna 40A). Data packets may be streamed between device 10 and the desired source during the active data session. If the data link is terminated before a successive 1x page slot, processing may loop back to step 300, as indicated by path 320.

If, however, the active data session lasts more than a half 1x paging interval (i.e., if the predetermined 1x paging slot occurs while the EV-DO data session has not been terminated), at least one of antennas 40 may be devoted to monitor for the presence of 1x paging signals (step 316). For example, the antenna that is receiving radio-frequency signals at higher signal levels may be selected as the antenna for monitoring the 1x paging signals. For example, consider a scenario in which antenna 40A is selected to monitor for the presence of 1x paging signals while antenna 40B is used for maintaining the EV-DO data session. In this example, 1x processor 204 may be used to configure switch 210 so that ports P2 and P3 are connected, to configured switch 212 so that ports P5 and P6 are connected, to configure switch 220 so that ports P7 and P9 are connected, to configure switch 222 so that ports P10 and P12 are connected, to configure switch 224 so that ports P13 and P14 are connected, and to configure switch 226 so that ports P16 and P17 are connected.

If no 1x page is detected using the selected antenna, processing may loop back to step 314 so that the data session may resume using at least antenna 40A and/or antenna 40B (as indicated by step 322). If a 1x page is detected, processing may proceed to step 306, as indicated by path 324. If path 324 is taken, the active data link may be terminated so that device 10 can devote its resources to establishing and maintaining a voice call (as an example). The steps of FIG. 6 are merely illustrative and do not serve to limit the scope of the present invention. If desired, any subset or all of antennas 40 may be used during each of the 1x and EV-DO wake periods. If desired, other approaches to of using the radio architecture of the type described in connection with FIG. 4 may be used to minimize potential interferences between wake periods associated with a first baseband processor in device 10 and wake periods associated with a second baseband processor in device 10.

The foregoing is merely illustrative of the principles of this invention and various modifications can be made by those skilled in the art without departing from the scope and spirit of the invention. The foregoing embodiments may be implemented individually or in any combination.

What is claimed is:

1. A wireless electronic device comprising:
    at least one antenna;
    a first baseband processor integrated circuit coupled to the antenna, wherein the first baseband processor integrated circuit is operable in a first baseband processor sleep state from which the first baseband processor integrated circuit awakes for a first wake period;
    a second baseband processor integrated circuit coupled to the antenna, wherein the second baseband processor integrated circuit is operable in a second baseband processor sleep state from which the second baseband processor integrated circuit awakes for a second wake period and is operable to send control signals to the first baseband processor integrated circuit to avoid collisions between the first and second wake periods;
    a first transceiver circuit coupled between the first baseband processor integrated circuit and the antenna; and
    a second transceiver circuit coupled between the second baseband processor integrated circuit and the antenna.

2. The wireless electronic device defined in claim 1 further comprising:
    an applications processor integrated circuit that is coupled to the first and second baseband processor integrated circuits.

3. The wireless electronic device defined in claim 1 further comprising:
    a radio-frequency diplexer that is coupled between the antenna and the first transceiver circuit and that is coupled between the antenna and the second transceiver circuit.

4. The wireless electronic device defined in claim 3 further comprising:
    a first radio-frequency duplexer that is coupled between the radio-frequency diplexer and the first transceiver circuit; and
    a second radio-frequency duplexer that is coupled between the radio-frequency diplexer and the second transceiver circuit.

5. The wireless electronic device defined in claim 3 further comprising:
- at least a first radio-frequency switch that switchably couples a selected one of the first and second transceiver circuits to the radio-frequency diplexer, wherein the first radio-frequency switch is configured to pass uplink radio-frequency signals; and
- at least a second radio-frequency switch that switchably couples the radio-frequency diplexer to a selected one of the first and second transceiver circuits, wherein the second radio-frequency switch is configured to pass downlink radio-frequency signals and wherein the first and second radio-frequency switches are controlled by the second baseband processor integrated circuit.

6. The wireless electronic device defined in claim 1, wherein the first and second baseband processor integrated circuits comprise cellular baseband processor integrated circuits operable to support cellular radio access technologies.

7. A method for operating an electronic device with first and second baseband processor integrated circuits and with at least first and second antennas, wherein the first and second baseband processor integrated circuits support corresponding sleep states, wherein the first baseband processor integrated circuit awakens from its sleep state during a first wake period and the second baseband processor integrated circuit awakens from its sleep state during a second wake period, the method comprising:
- conveying information between the first and second baseband processor integrated circuits using inter-processor communications to avoid wakeup time collisions between the first and second baseband processor integrated circuits; and
- when the first wake period exceeds a predetermined amount of time, using the first antenna to handle the first baseband processor active traffic mode and using the second antenna to handle the second baseband processor active traffic mode.

8. The method defined in claim 7 wherein conveying the information between the first and second baseband processor integrated circuits comprises conveying control signals between the first and second baseband processor integrated circuits to ensure that the first and second wake periods are non-overlapping in time.

9. The method defined in claim 8 further comprising:
- during the first wake period, monitoring for first paging signals associated with the first baseband processor integrated circuit; and
- during the second wake period, monitoring for second paging signals associated with the second baseband processor integrated circuit.

10. The method defined in claim 9 further comprising:
- in response to detecting the first paging signals during the first wake period, placing the first baseband processor integrated circuit in a first baseband processor active traffic mode; and
- in response to detecting the second paging signals during the second wake period, placing the second baseband processor integrated circuit in a second baseband processor active traffic mode.

11. The method defined in claim 10 further comprising:
- when the first wake period exceeds the predetermined amount of time, preventing the second baseband processor integrated circuit from awakening from its sleep state.

12. The method defined in claim 10 wherein the first and second baseband processor integrated circuits comprise cellular baseband processor integrated circuits, wherein placing the first baseband processor integrated circuit in the first baseband processor active traffic mode comprises establishing a live voice call, and wherein placing the second baseband processor integrated circuit in the second baseband processor active traffic mode comprises establishing an active data session.

* * * * *